US008176310B2

(12) United States Patent
Xu

(10) Patent No.: US 8,176,310 B2
(45) Date of Patent: May 8, 2012

(54) DEBUGGER APPLICATION CONFIGURED TO COMMUNICATE WITH A DEBUGGER MODULE VIA A GPIO

(75) Inventor: Yong Xin Xu, Nanjing (CN)

(73) Assignee: Phoenix Technologies Ltd., Milpitas, CA (US)

( * ) Notice: Subject to any disclaimer, the term of this patent is extended or adjusted under 35 U.S.C. 154(b) by 391 days.

(21) Appl. No.: 12/456,668

(22) Filed: Jun. 19, 2009

(65) Prior Publication Data
US 2010/0325403 A1    Dec. 23, 2010

(51) Int. Cl.
G06F 15/177    (2006.01)
G06F 13/00     (2006.01)
G06F 13/14     (2006.01)

(52) U.S. Cl. ............... 713/2; 713/1; 710/107; 710/240; 370/351; 370/476

(58) Field of Classification Search ............. 713/1, 2; 710/107, 240; 370/351, 476
See application file for complete search history.

(56) References Cited

U.S. PATENT DOCUMENTS

| | | | | |
|---|---|---|---|---|
| 5,103,446 | A * | 4/1992 | Fischer | 370/236 |
| 5,506,965 | A | 4/1996 | Naoe | |
| 6,298,066 | B1 * | 10/2001 | Wettroth et al. | 370/449 |
| 6,418,538 | B1 * | 7/2002 | Garney et al. | 713/502 |
| 7,069,365 | B2 | 6/2006 | Zatorski | |
| 2003/0005194 | A1 * | 1/2003 | Stone et al. | 710/107 |
| 2003/0120739 | A1 * | 6/2003 | Garney et al. | 709/213 |
| 2004/0208200 | A1 * | 10/2004 | Hejdeman et al. | 370/476 |
| 2006/0153326 | A1 * | 7/2006 | Choi | 375/360 |
| 2007/0014279 | A1 * | 1/2007 | Wang et al. | 370/351 |
| 2007/0168746 | A1 | 7/2007 | Righi et al. | |
| 2007/0182449 | A1 * | 8/2007 | Taylor | 326/80 |
| 2008/0235546 | A1 * | 9/2008 | Wei et al. | 714/731 |
| 2008/0307134 | A1 * | 12/2008 | Geissler et al. | 710/110 |

OTHER PUBLICATIONS

Cortex-M1 Revision: r0p1 Technical Reference Manual, 2006-2008, ARM Limited, 234 pages.
AVR274: Single-wire Software UART, 8-bit AVR Microcontrollers Application Note, printed May 26, 2009, 14 pages.
Integrated Circuits Data Sheet, P82B715 I2C bus extender, Product data, Dec. 2, 2003, Philips Semiconductors, 12 pages.
General Purpose Input/Output, http://en.wikipedia.org/wiki/GPIO, printed May 26, 2009, 1 page.
HTBasic GPIO Tutorial, http://www.techsoft.de/htbasic/tutgpio.htm, 4 pages, printed May 26, 2009.
Mehta, Mehul, "Effective use of GPIO pins as Debugging pins" Dashboard May 2007 Issue, eInfochips, 5 pages.
Background Debug Mode interface, http://en.wikipedia.org/wiki/Background_Debug_Mode_Interface, printed May 26, 2009, 4 pages.

* cited by examiner

Primary Examiner — Vincent Tran
(74) Attorney, Agent, or Firm — Brokaw Patent Law PC; Christopher J Brokaw

(57) ABSTRACT

Methods, systems, apparatuses and program products are disclosed for communications such as may be used for debugging computers and similar electronic products at a level suitable for low level firmware. This may find application, for example, in environments after cache initialization around the time of memory bring up or motherboard device enumeration but including durability into and beyond software loading.
GPIO (General Purpose input/output) connections may be used for communication that may, for some purposes, be regarded as half-duplex but without necessarily being anisochronous.

19 Claims, 7 Drawing Sheets

DEBUGGER APPLICATION CONFIGURED TO COMMUNICATE WITH A DEBUGGER MODULE VIA A GPIO

FIELD OF THE INVENTION

The present invention generally relates to personal computers and devices sharing similar architectures, and, more particularly relates to a system and method for debugging such as for firmware, for example computer BIOS (Basic Input/Output System). The methods and systems make use of a debugger application executing on a host computer and configured to communicate with a debugger module executing on a target electronic device under test via a GPIO (General Purpose Input/Output) and/or similar and other means such as, for example, serial/parallel/USB (Universal Serial Bus) of host computer(s), adapter and Bus of the electronic device. Provision for multipoint operation may be made. Typically, the electronic device will be a laptop computer, but embodiments of the invention find application on a broader range of device.

BACKGROUND OF THE INVENTION

Modernly, turn-on and bring-up of a commonplace electronic device such as a computer is complex, far more so than was the case in earlier generations of commonly available computers. Much of the complexity is hidden from the causal user and from a majority of software developers.

During early computer start-up the main semiconductor memory is typically not available, and a cache memory (which may be on or off the CPU (Central Processor Unit)) chip(s) is used by firmware as general purpose memory (e.g. for stack) in order execute instruction codes to determine the presence and characteristics of any RAM (Random Access Memory) present. This is commonly performed by means of a dialog on an I2C (Inter-Integrated Circuit) which is a slow, multi-master serial computer bus. This is an early part of a complex many-stage process by which a computer pulls itself up by its (metaphorical) bootstraps, commonly referred to simply as booting. Having located any RAM present the RAM can be configured in and the loading process may advance to a next step and, in due course, to a POST (Power-On Self Test).

SMBus (System Management Bus) is a two-signal bus, a subset of I2C and used for communication with low-bandwidth devices on a motherboard, especially power-related chips such as a laptop rechargeable battery subsystem. One purpose of deploying SMBus is to promote robustness with interoperability.

I2C and/or SMBus have been proposed for communication between a debugging station (host) and a target. Inter alia, so doing avoids problems of using communications facilities which may be so rich as to preclude simple code support within the target device and/or which may be trampled on by software loaded later in a typical booting process. Such an arrangement might be needed, for example, for debugging a POST (Power-On Self Test) firmware routine however there are disadvantages pursuant to using I2C and/or SMBus in this way. Such previously developed solutions may, for example, adversely interact with the very I2C circuits that comprise the test-target feature within the code under test. Also SMBus requires at least two wires (in addition to reference ground); one each for clock and for data. The term "wire" is used (herein) as commonly understood in the well-known VHDL (very high speed integrated circuit hardware definition language) arts and does not necessary refer to a cabled metallic conductor.

Single-wire UART (Universal Asynchronous Receiver-Transmitter) has also been used for communications where performance criteria are relatively modest, including debugging station connection. Single wire UART is well-known in the art but, as compared with single-wire UART, embodiments of the invention offer at least two significant advantages: firstly a single master, multiple slaves multipoint communications topology may be used. Previously developed solutions using single-wire UART have provided point-to-point communication. Secondly, the communication speed and protocol can be readily be adjusted by firmware and/or software adjustable settings. Single-wire UART implementations are lack sufficient flexibility in that regard, in part because of standards constraints.

In summary, single-wire GPIO communication has the advantages as I2C, and has the low cost as single-wire UART.

The present invention may overcome certain disadvantages of using resources visible to OS (operating system) and also the disadvantages of using SMBus for debugging communication. At the same time it can be more cost effective than more traditional previously developed solutions such as ICE (In-circuit Emulation). That is not to suggest that the only problem with using ICE and the like is the cost thereof.

Thus, the disclosed improved computer designs include embodiments of the present invention enable superior tradeoffs in regards to the problems and shortcomings outlined above, and more.

SUMMARY OF THE INVENTION

The present invention provides a system, apparatus and method for operating a computer for communications such as may be used for debugging computers and similar electronic products at a level suitable for low level firmware.

GPIO (General Purpose input/output) connections may be used for communication that may, for some purposes, be regarded as half-duplex but without necessarily being anisochronous.

According to an aspect of the present invention an embodiment of the invention may provide for a method of communicating through a GPIO connected data line by interpreting computer coded instructions to transmit a start signal, then a series of isochronous signals to form a header and turning the data line around to receive still isochronously after a predetermined delay.

According to another aspect of the present invention similar and/or comparable multipoint communication may be effected through a GPIO line, again using and anisochronous start signal and isochronous header and data information.

In each embodiment, the receiver clock may be free running after synchronization to an edge of the start signal.

Several variants of these aspects are also discussed together with alternative exemplary embodiments.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

For convenience in description, identical components have been given the same reference numbers in the various drawings.

DETAILED DESCRIPTION OF THE PREFERRED EMBODIMENTS

Figure 1:
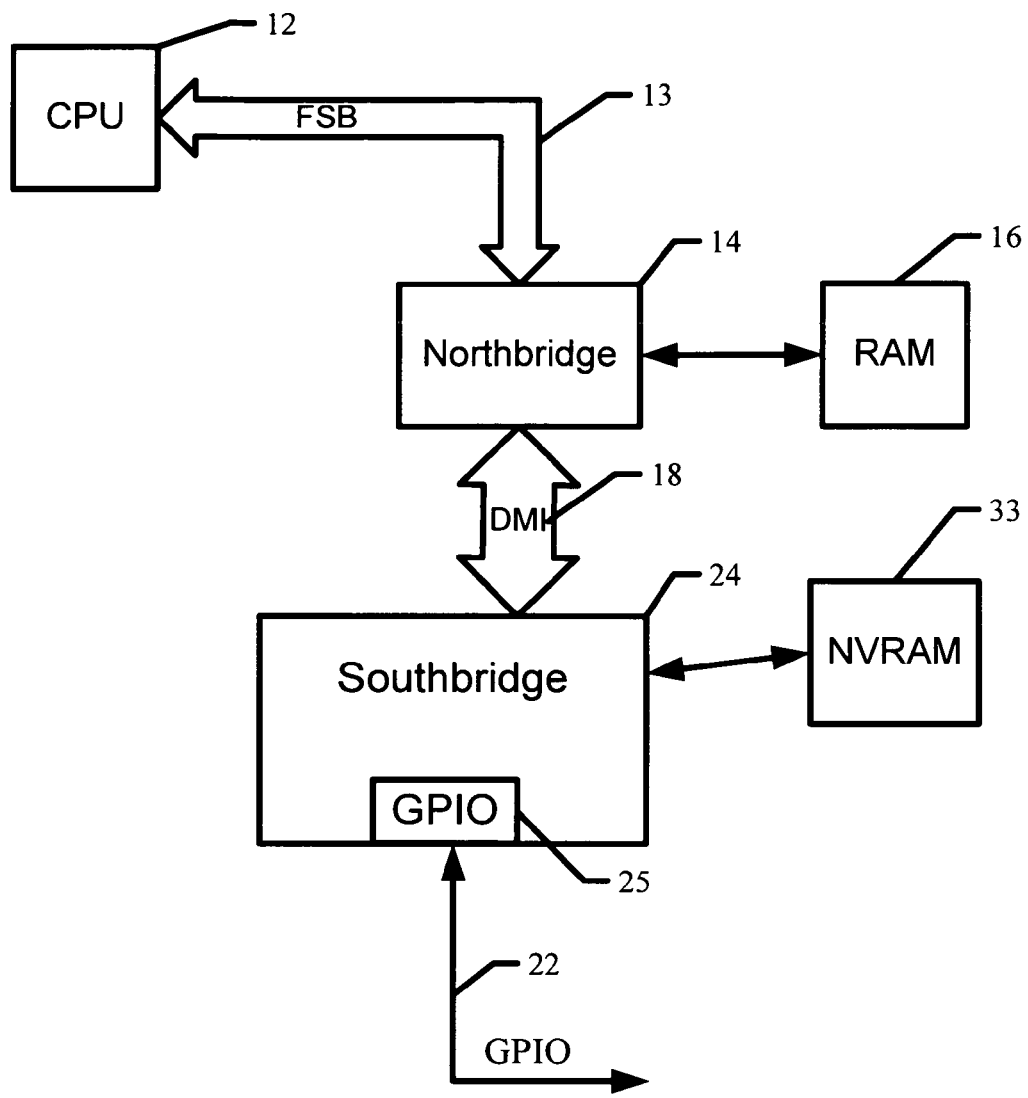
FIG. 1 is a schematic block diagram of an electronic device under test according to an embodiment of the invention of the present invention.

In the following description, for purposes of clarity and conciseness of the description, not all of the numerous components shown in the schematics and/or drawings are described. The numerous components are shown in the drawings to provide a person of ordinary skill in the art a thorough, enabling disclosure of the present invention. The operation of many of the components would be understood and apparent to one skilled in the art.

The description of well known components is not included within this description so as not to obscure the disclosure or take away or otherwise reduce the novelty of the present invention and the main benefits provided thereby.

An exemplary embodiment of the present invention will now be described with reference to the figures.

FIG. 1 is a schematic block diagram of an electronic device under test 10 according to an embodiment of the invention of the present invention.

In an exemplary embodiment, the electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace.

The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

The bus controller 14 may also be coupled to a system bus 18, for example a DMI (Direct Media Interface) in typical Intel® style embodiments. Coupled to the DMI 18 may be a so-called Southbridge chip such as an Intel® ICH8 (Input/Output Controller Hub type 8) chip 24

The Southbridge chip 24, may interface to an NVRAM 33 (Non-volatile Random Access Memory) which may be used to store configuration parameters and a firmware such as a BIOS (Basic Input-Output System), as is well-known in the art.

In a typical embodiment of the invention, the Southbridge chip 24 may be provided with a GPIO (General Purpose Input-Output) port 25 that connects to a 2-wire (signal and ground reference) connection 22 to a host computer, system or adapter (none shown in FIG. 1).

In using a mobile PC, such as the electronic computing device of FIG. 1, commonly a mobile PC user will start an active session by bringing his or her PC to an operating state; then cause or allow a connection to Internet to be activated; perform various computer oriented task and then, later, end the active session by causing or allowing the computer to enter one or other form of standby or shutdown state or similarly comparable condition.

Figure 2:
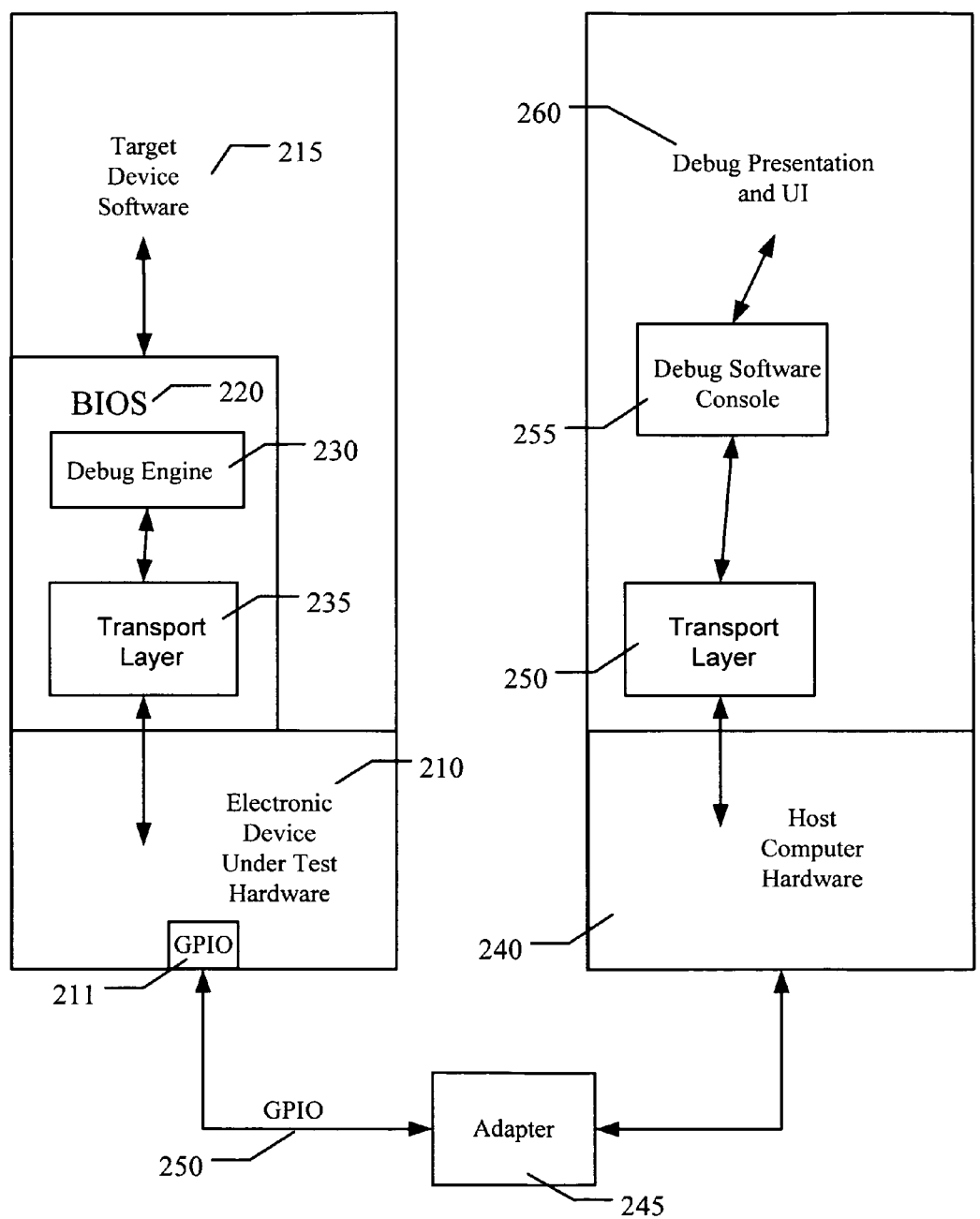
FIG. 2 is a block diagram of a debug system according to an embodiment of the invention.

FIG. 2 is a block diagram of a debug system 200 using GPIO communication 250 according to an embodiment of the invention. The debug system comprises host computer hardware 240 with an attached communications adapter 245 and a hardware electronic device-under-test 210.

The target computer may execute a firmware BIOS 220 that may be debugged by the system 200 using the host computer 240. The debug engine 230 may be a firmware component module of the BIOS 220 that provides at least a debug function and interacts with the transport layer 235. The transport layer 235 may be another firmware component module of the BIOS 220 that provides a communication function using a GPIO port 211 and a GPIO wire 250.

As is well-known in the art, firmware such as BIOS 220 may be loaded from ROM (Read-Only Memory) into a shadow RAM (Random Access Memory), and executed as if it were software (not shown in FIG. 2). Target device software 215 may also be present and may or may not participate in the debugging process, for example by facilitating the stimulation of fault conditions to be trapped, analyzed and debugged.

The adapter 245 may be a communication protocol converter. Typically, it connects a host computer in any of various ways and connects to GPIO communications. Adapter 245 may connect to host computer using any of a number of traditional communication channel interfaces, for example using USB (Universal Series Bus) or a serial port conforming to the well-known EIA-RS-232 (Electrical Industries Association Recommended Standard number 232) interface. This adapter 245 may be responsible for receiving data from the electronic device under test 210 and sending it to the host computer 240, and conversely for data travelling in the reverse direction. In an embodiment, the adapter may comprise an MCU (Micro-Controller Unit), RAM (Random Access Memory), ROM (Read-Only Memory), GPIO and USB/serial port and/etc. In other embodiments of the invention, the adapter may be entirely omitted for reason that it becomes unnecessary when the host computer 240 supports a use of GPIO natively. Nonetheless, some form of isolation may be needed, such as to avoid ground loop problems.

The host computer 240 may run a debug software stack under an operating system. Typically this includes a debug presentation and user interface 260 to the debug user and/or a debug software console feature. A transport layer 250 may be a software module that provides communication functions for debug software. Typically the Transport Layer 250 in the host computer may be more fully featured than the minimal version 235 provided within the BIOS 220 of the hardware electronic device-under-test 210. Other comparable arrangements may be used as will be apparent to persons of ordinary skill in the debugging arts.

In debug system embodiments 200 as described, the host computer 240 need only provide one GPIO wire for digital signal (and a second ground wire for reference voltage). GPIO signals are essentially electrically baseband and unbalanced and may include a 0 Hz (DC—direct current) component. The electronic device-under-test 210 and adapter 245 may thus communicate each with the other through GPIO communication protocols. In embodiments of the invention, the electronic device-under-test 210 may act as the communication master, and adapter acts as the communication slave, or vice versa, or they may continually exchange roles during normal operation. The debug system 200 may rely entirely on half-duplex, point to point communication. Higher level software modules may also add additional features such as CRC (Cyclical Redundancy Check) and/or re-send etc. to provide enhanced communication reliability.

Figure 3A:
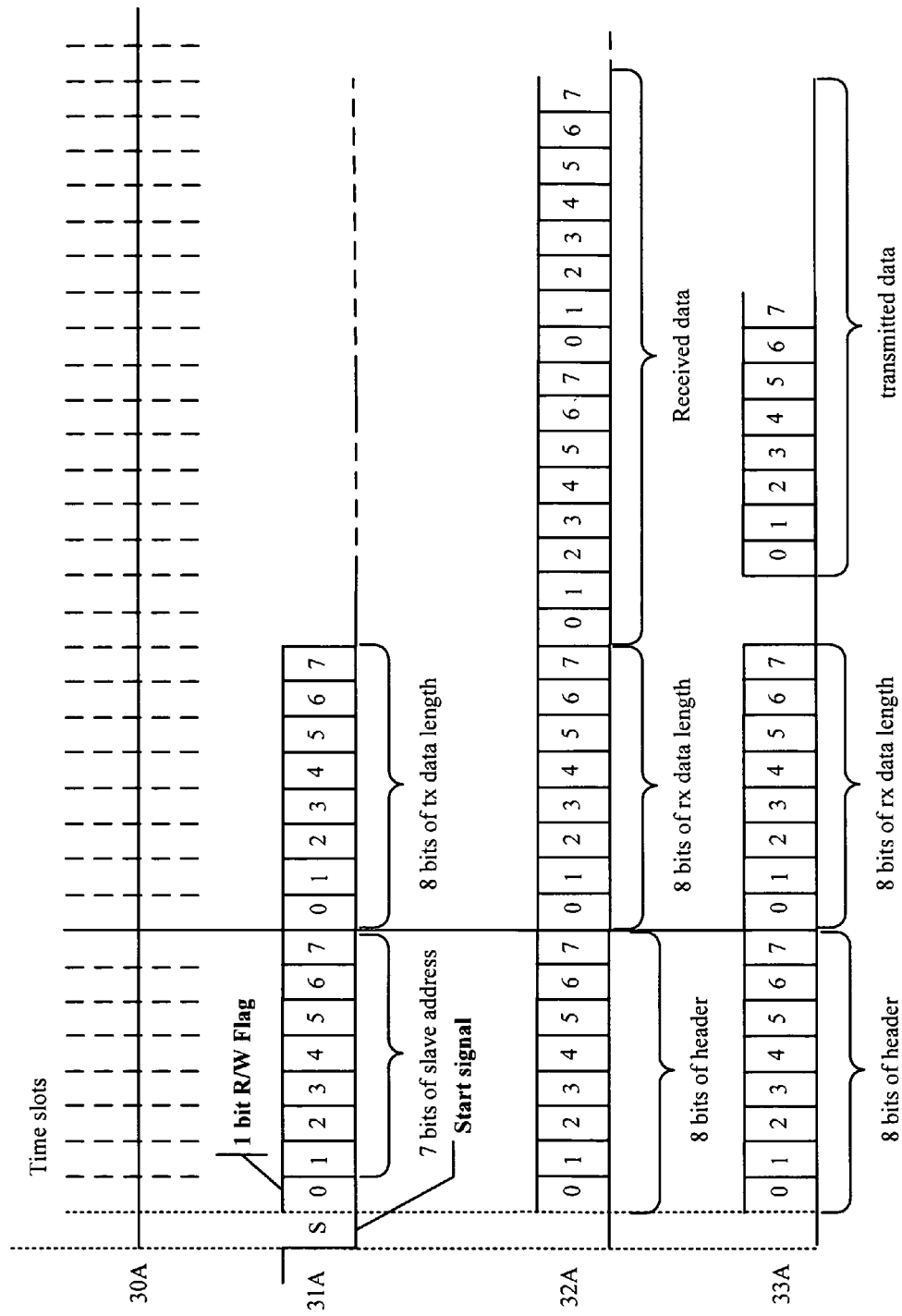
FIGS. 3A, 3B, and 3C are timing diagrams that illustrate various aspects of certain embodiments of the invention.
Figure 3B:
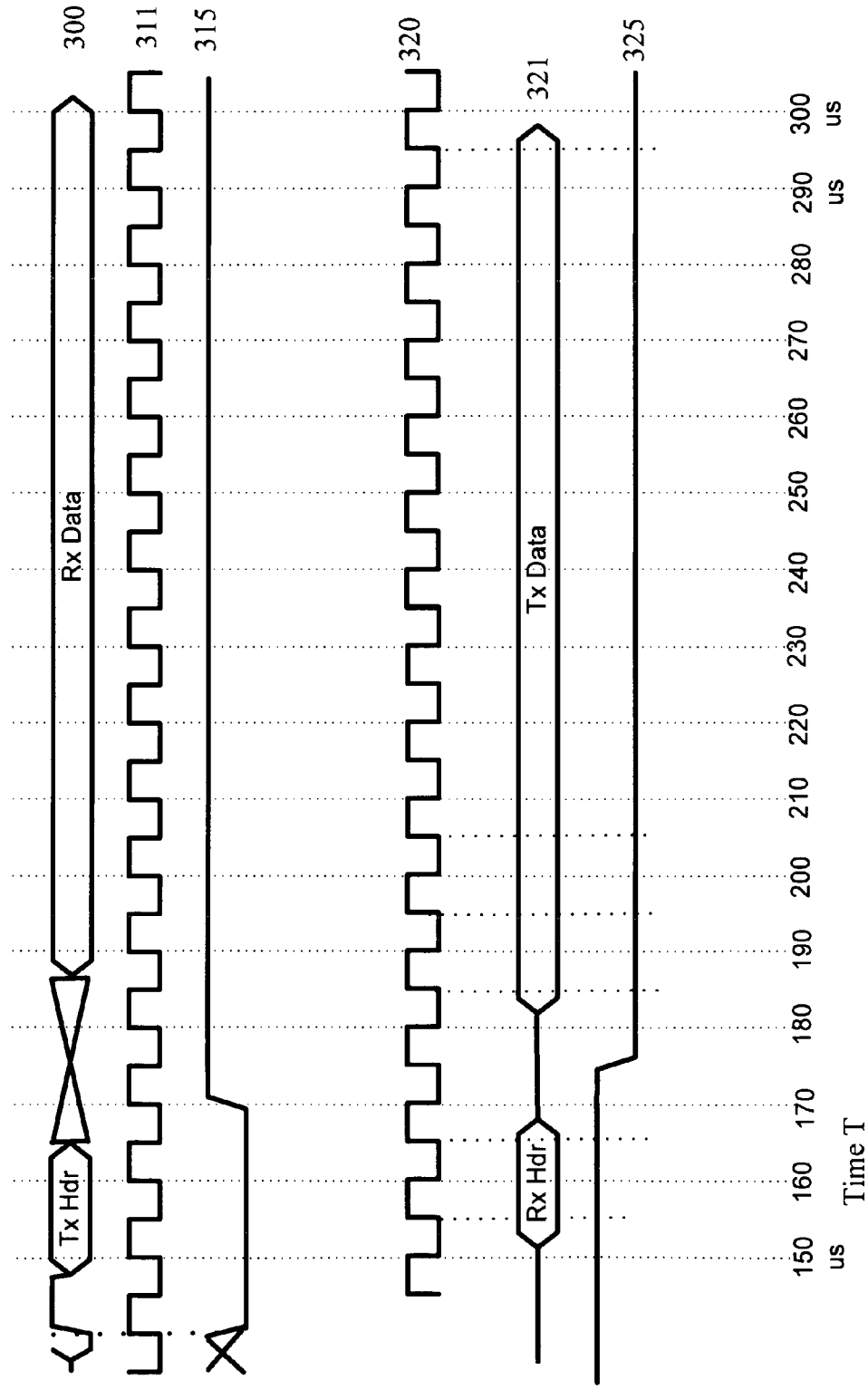
Figure 3C:
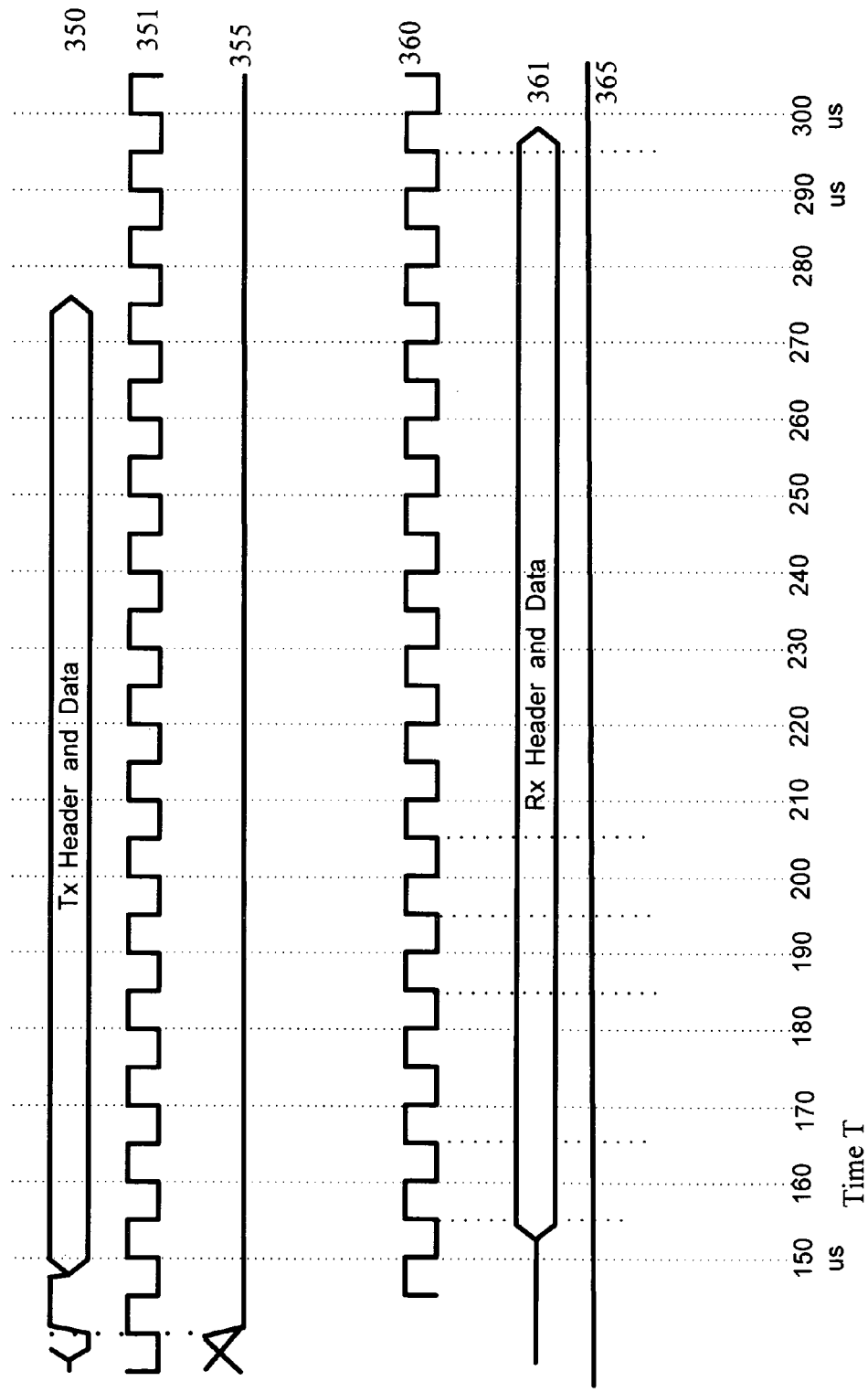

FIGS. 3A, 3B, and 3C are timing diagrams that illustrate various aspects of certain embodiments of the invention.

Referring to FIG. 3A, line 30A represents a series of time slots. Data transmission and reception proceeds isochronously within frames and anisochronously between frames. Line 31A represents data at the master end of a GPIO transmission link and lines 32A and 33A represent alternative versions of data seen at the corresponding slave end of the same link. The timing diagram of FIG. 3A is not sufficiently fine in scale that propagation time across the link is shown, it is assumed to be negligible for the purposes of FIG. 3A, moreover rise time of edges is assumed to be of negligible duration at both transmitter and receiver ends.

Still referring to FIG. 3A, the communication is initiated by master end of the GPIO link. For the purposes of the figure the Y axis relates to voltage and the X axis to elapsed time. Also positive logic is assumed with reference zero. Thus data may be encoded according to commonplace industry usage of the well-known NRZ1 (non-return to zero for a binary one). Although it is certainly feasible to use, complex transceivers and encodings such as Manchester encoding may be used to remove all significant 0 Hz (direct current) component from the signal, however such techniques may be appropriate in the event that it is important to electrically isolate systems (for example to prevent ground loop currents) or to use extended distance (proportionate to data rate) (tele)communication. Other encodings may be used. Commonly found in the industry are NRZ0 (non-return to zero for a zero) which is basically the negative logic version of NRZ1, and also NRZI (non-return to zero for an inversion). NRZI is, in practice seldom used in baseband circuits but will effectively limit the lower bound of bandwidth in HDLC (high-level data link control) channels.

Referring again to FIG. 3A, in line 31A, a start signal is sent first. The falling edge of the start signal provides the receiver with bit synchronization in much the same way as is done with traditional Asynchronous transmission, however the one bit synchronization is not for just one character but serves for an entire communication frame.

Next in line 31A comes a single bit of direction indicator. This is used to signal whether the frame is simplex or half-duplex. Line 32A shows a receiver view of a communication for a simplex frame, line 33A shows a receiver view of a communication for a half-duplex frame.

At line 31A, the next seven bits may be used for slave address, which is significantly mostly in a context of multi-port half-duplex operation. Then follows eight bits of transmission data length. In this exemplary embodiment of the invention this limits the data portion to 256 bytes if the length is simply encoded. However other arrangements, such as with longer data lengths are possible within the general scope of the invention.

In the case of a simplex transmission, line 32A is followed and the master may continue uninterrupted with data transmission and the receiver likewise. Usual communications techniques such as CRC (cyclic redundancy check) and even higher-level protocols such as IP (Internet Protocol) may be used to improve integrity, performance and the like.

In the case of a half-duplex transmission, the master ceases to impress signals on the communications line and turns it around to a receive mode. The time-base or data clock continues free-running so that bit synchronization is not lost. Conversely, the slave turns the line around to transmit and begins sending transmitted data as shown in line 33A. This line turnaround may be accomplished in exactly two bit times (or some small but greater number of bit times). Thus transmitted data is isochronous with the received data in the same frame (and conversely for the master end of the link).

FIG. 3B is a timing diagram for a half-duplex frame. It shows that there is a finite, and can even be a significant time between the transmitter impressing a baseband level on the communication link and the corresponding bit being optimally sampled at the receiving end of the link. Line 311 represents the internal clock signal at the master end of the GPIO link. Line 300 represents the signal seen on the GPIO wire at the master end. Line 315 represents the direction signal, this may be an actual voltage at a half-duplex transceiver or it may simply be a status bit in a GPIO controller register.

Line 320 represents the corresponding internal clock signal at the slave end of the link and line 321 the signal seen at the slave end. Line 325 is the slave end direction signal.

In the timing example, the start signal is shown as a rising edge near the left end of line 300, it could equally be implemented as a falling edge. The start signal is used to synchronize the receiver clock 320. Line 315 shows the master direction is low around the time of the start signal, low indicating output according to a common but arbitrary convention (O or 0=output, I or 1=input). Continuing with the example, at time 150 us (microseconds) the master sends the header (shown as abbreviated two bits to simplify the diagram to the point of manageability but the principle is the same for a two byte header as described elsewhere herein). In the example, at time 155 us the receiver latches the corresponding received bit half a bit time (or one clock edge) later than it was impressed on the link, as shown in line 321. As shown line turnaround is accomplished in two bit period.

FIG. 3C is a timing diagram for a simplex frame. Overall operation is simpler than using half duplex frames. In point-to-point implementations it is entirely feasible to provide a duplex data path by arranging that each end of the link is alternately master and slave thus providing a higher-level form of half-duplex operation wherein each frame is simplex only. Line 351 represents the internal clock signal at the master end of the GPIO link. Line 350 represents the signal seen on the GPIO wire at the master end. Line 355 represents the direction signal, this may be an actual voltage at a half-duplex transceiver or it may simply be a status bit in a GPIO controller register.

Figure 4:
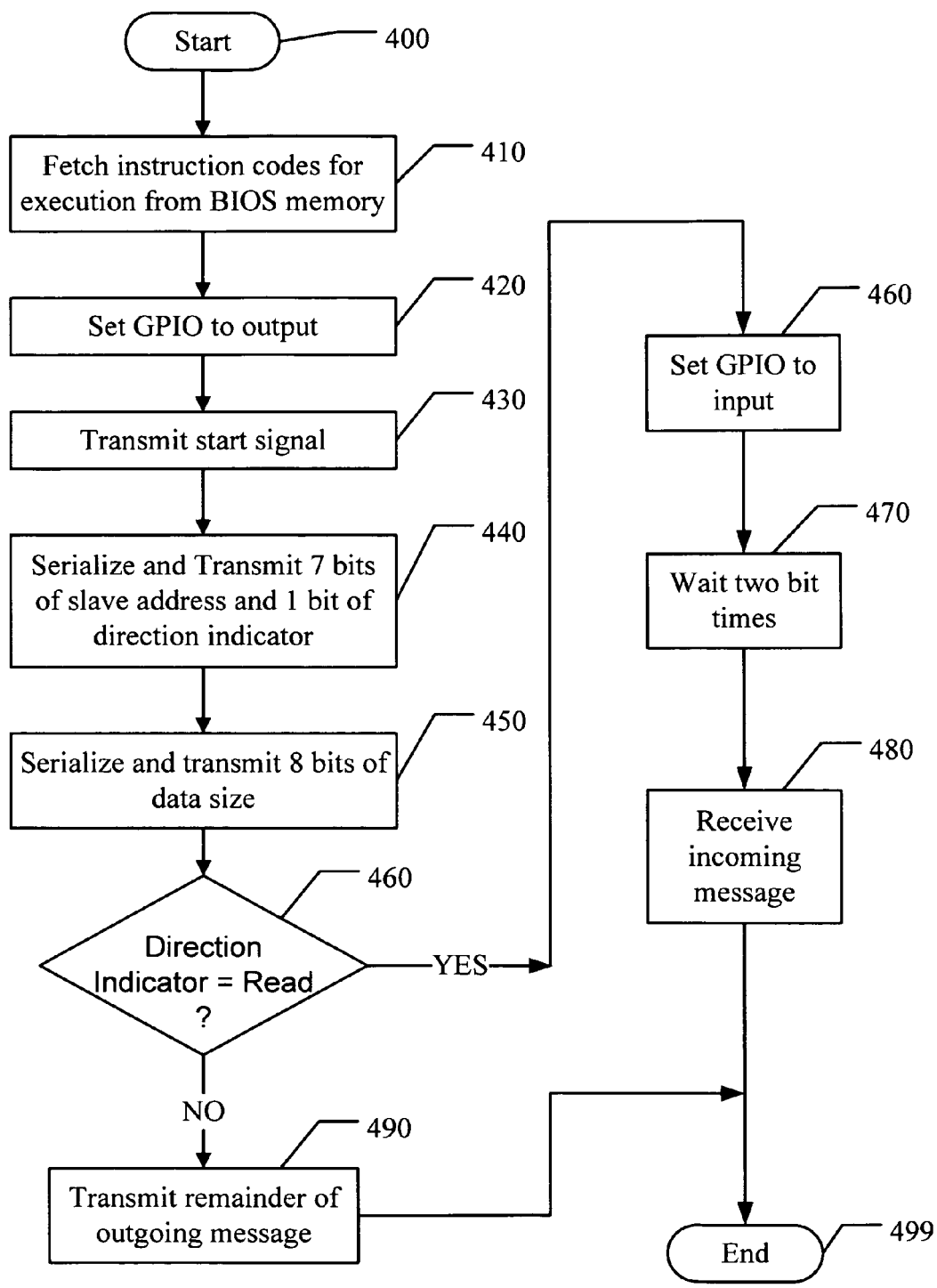
FIG. 4 is a flowchart illustrating the steps of debug messaging according to an embodiment of the present invention.

Line 360 represents the corresponding internal clock signal at the slave end of the link and line 361 the signal seen at the slave end. Line 365 is the slave end direction signal FIG. 4 is a flow chart illustrating the steps performed in a debug messaging according to an embodiment of the invention of the present invention. FIG. 4 is purely exemplary and many alternative embodiments are possible within the general scope of the invention.

At ref. 400 the method starts. Within an electronic device under test, at ref. 410 instruction codes are fetched by a CPU from memory, such as a ROM, and interpreted by the CPU of the electronic device as executable computer code. This allows the CPU to direct operation of the electronic device At ref. 420, codes are executed which caused the GPIO port to be set to output. This allows the electronic device under test to transmit data using the GPIO port. Typically this will involve clearing a status register bit in a controller such as a Southbridge chip although many variations are possible within the general scope of the invention.

Still referring to FIG. 4, at Ref. 430 the start signal is impressed onto the GPIO port. Typically this may cause the pulling of the voltage on the GPIO circuit low, to a near zero voltage state. Equivalent implementations are possible, for example using negative logic on the data signal.

At Ref. 440, one bit of R/W (Read or Write) direction indicator value and seven bits of address are transmitted onto to GPIO. Serialize and Transmit 7 bits of slave address and 1 bit of direction indicator. The slave address bits are primarily used in multipoint arrangements by which the master on a connection can designate a slave device. Such arrangements (multiple slaves and one master device) would more typically have the host computer as the master and electronic devices under test as the slaves for reason that the master code would be more complex and hence more easily accommodated within the software of the host computer than within the firmware of the electronic device under test. However, it is entirely feasible to operate with the host computer as a slave and a designated electronic device under test as a master communications device within the general scope of the invention.

At Ref. 450 the electronic device under test can then serialize and transmit 8 bits of data size. This gives the size of the data to follow. At Ref. 460 a decision is made, such as by testing a direction indicator to determine whether the data direction is a read (data flows towards the master station) or a write (data flows away from the master station). Accordingly control is transferred to either Ref. 490 or Ref. 460 as shown in FIG. 4.

Assuming that the data direction is determined to be the write direction the at Ref. 490 the remainder of the outgoing message is transmitted and the process ends at Ref. 499.

Alternatively, the line is to be turned around and at Ref. 460 the GPIO port is set to be input, such as by setting a certain status register bit in a controller. The use and control of GPIO by means of controller registers is well-known in the art.

At Ref. 470 there is a wait for two bit times, this at least serves the purposes of allowing both ends of the communications link to turn the line around (from transmit to receive or vice versa). Because the bit spacings are isochronous and the clocks are restartable with synchronization but free-running, it is not necessary to regain bit sync. Two bit frames is not a crucial amount of time, a greater number could be used.

At Ref. 480 the incoming message is received and at Ref. 499 the process ends.

Figure 5:
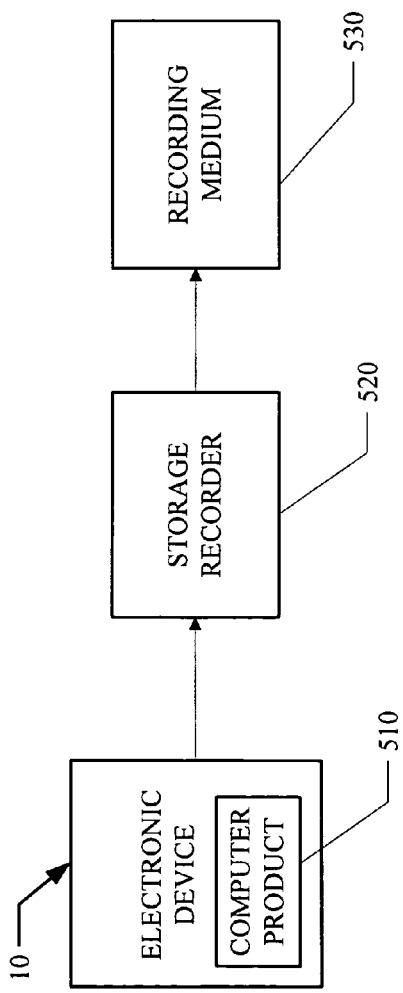
FIG. 5 shows how an exemplary embodiment of the invention may be encoded onto a computer medium or media.

FIG. 5 shows how an exemplary embodiment of the invention may be encoded onto a computer medium or media.

With regards to FIG. 5, computer instructions to be incorporated into in an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
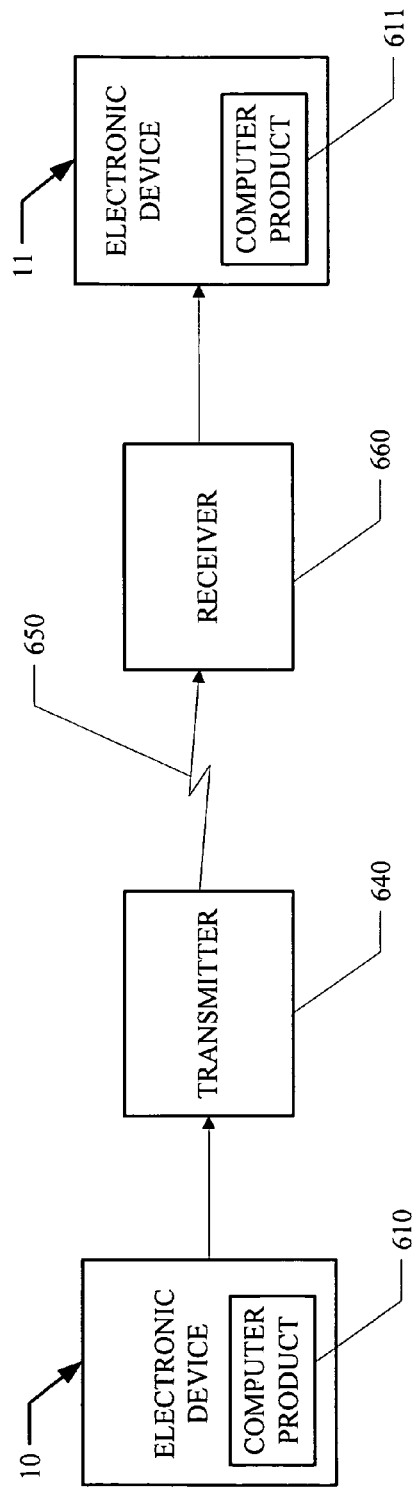
FIG. 6 shows how an exemplary embodiment of the invention may be encoded, transmitted, received and decoded using electro-magnetic waves.

FIG. 6 shows how an exemplary embodiment of the invention may be encoded, transmitted, received and decoded using electro-magnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies devices could also be used to construct alternative embodiments of the invention.

The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of communicating between a first computer and a second computer, the first computer interpreting a plurality of coded instructions to perform acts of:
   transmitting a start signal onto a conductor;
   transmitting a series of transmitted data signals on the conductor wherein each of the transmitted data signals is isochronous with the start signal; and
   receiving a series of received data signals from the conductor wherein the receiving commences at a pre-determined interval after completion of the transmitting a series of transmitted data signals,
   wherein the pre-determined interval is an integer multiple of the inverse of a modulation rate of the transmitted data signals and the integer is at least two.

2. The method of claim 1 wherein:
   the conductor is connected to the first computer by a GPIO (general purpose input-output) port.

3. The method of claim 2 wherein:
   the plurality of coded instructions are comprised within a firmware.

4. The method of claim 2 wherein:
   the transmitted data signals and the received data signals are binary base-band signals.

5. The method of claim 2 wherein:
   the transmitted data signals are binary base-band NRZ1 (non-return to zero for a one) signals or binary NRZ0 (non-return to zero for a zero) signals.

6. The method of claim 2 wherein:
   the transmitted data signals are binary base-band NRZI (non-return to zero for an inversion).

7. The method of claim 2 wherein:
   the received data signals are isochronous with the transmitted data signals.

8. The method of claim 2 wherein:
the series of transmitted data signals comprise a transmission header and the transmission header comprises an encoded length of the series of received data signals.

9. The method of claim 2 wherein:
the series of received data signals comprise a received data header and the received data header comprises an encoded length of the series of received data signals.

10. The method of claim 2 wherein:
the plurality of coded instructions are comprised within a BIOS (Basic Input-Output System) firmware or within a POST (Power-On Self-Test) firmware.

11. The method of claim 2 wherein:
the second computer hosts a debugging application for debugging instruction codes being interpreted by the first computer or
the first computer hosts a debugging application for debugging instruction codes being interpreted by the second computer.

12. A method of communicating between a first computer, a second computer and a third computer, the first computer interpreting a plurality of coded instructions to perform acts of:
transmitting a start signal onto a conductor connected to the first computer, to the second computer and to the third computer each by a respective GPIO (general purpose input-output) port;
transmitting a series of transmitted data signals comprising a transmission header on the conductor wherein each of the transmitted data signals is isochronous with the start signal and wherein the transmission header comprises an address field comprising an encoding of an address of one addressed computer selected from a list consisting of the second computer and the third computer; and
receiving a series of received data signals sent from the addressed computer responsive to a value of the encoding of the address, the receiving being via the conductor, wherein the receiving commences at a pre-determined interval after completion of the transmitting a series of transmitted data signal,
wherein the pre-determined interval is an integer multiple of the inverse of a modulation rate of the transmitted data signals and the integer is at least two.

13. The method of claim 12 wherein:
the transmitted data signals and the received data signals are binary base-band signals.

14. The method of claim 12 wherein:
the received data signals are isochronous with the transmitted data signals and
the transmission header comprises an encoded length of the series of received data signals.

15. The method of claim 12 wherein:
the received data signals are isochronous with the transmitted data signals and
the series of received data signals comprise a received data header and the received data header comprises an encoded length of the series of received data signals.

16. The method of claim 12 wherein:
the second computer hosts a debugging application for debugging instruction codes being interested by the first computer or
the first computer hosts a debugging application for debugging instruction codes being interested by the second computer.

17. A computer comprising:
means for transmitting a start signal onto a conductor;
means for transmitting a series of transmitted data signals on the conductor wherein each of the transmitted data signals is isochronous with the start signal; and
means for receiving a series of received data signals from the conductor wherein the receiving commences at a pre-determined interval after completion of the transmitting a series of transmitted data signals,
wherein the pre-determined interval is an integer multiple of the inverse of a modulation rate of the transmitted data signals and the integer is at least two.

18. A computer operable to interpret a plurality of coded instructions to perform the acts of:
transmitting a start signal onto a conductor;
transmitting a series of transmitted data signals on the conductor wherein each of the transmitted data signals is isochronous with the start signal; and
receiving a series of received data signals from the conductor wherein the receiving commences at a pre-determined interval after completion of the transmitting a series of transmitted data signals,
wherein the pre-determined interval is an integer multiple of the inverse of a modulation rate of the transmitted data signals and the integer is at least two.

19. A system comprising a first computer having a conductor connected to a GPIO (general purpose input-output) port, a second computer and a third computer, the first computer being operable to interpret a plurality of coded instructions to perform the acts of:
transmitting a start signal onto the conductor via the GPIO port;
transmitting a series of transmitted data signals comprising a transmission header onto the conductor via the GPIO port wherein each of the transmitted data signals is isochronous with the start signal and wherein the transmission header comprises an address field comprising an encoding of an address of one addressed computer selected from a list consisting of the second computer and the third computer; and
receiving a series of received data signals sent from the addressed computer responsive to a value of the encoding of the address, the receiving being via the GPIO port, wherein the receiving commences at a pre-determined interval after completion of the transmitting a series of transmitted data signal,
wherein the pre-determined interval is an integer multiple of the inverse of a modulation rate of the transmitted data signals and the integer is at least two.

* * * * *